United States Patent [19]
Dey

[11] Patent Number: 5,054,929
[45] Date of Patent: Oct. 8, 1991

[54] OPTICAL ALIGNMENT METHOD USING ARBITRARY GEOMETRIC FIGURES

[75] Inventor: Thomas W. Dey, Springwater, N.Y.

[73] Assignee: Eastman Kodak Company, Rochester, N.Y.

[21] Appl. No.: 516,006

[22] Filed: Apr. 26, 1990

[51] Int. Cl.$^5$ .............................................. G01B 11/00

[52] U.S. Cl. .................................... 356/401; 356/153; 356/399; 350/275

[58] Field of Search ............... 356/399, 400, 401, 138, 356/150, 153; 250/237 G; 350/272, 275

[56] References Cited

U.S. PATENT DOCUMENTS 4,371,264 2/1983 Lacombat et al. .................. 356/401
4,890,918 1/1990 Monford ............................ 356/399

*Primary Examiner*—Samuel Turner

*Attorney, Agent, or Firm*—Stephen C. Kaufman

[57] ABSTRACT

A novel method that is suitable for uniquely aligning first and second objects. A pre-alignment stage of one aspect of the novel method comprises generating on a first object a first geometric configuration comprising dark and clear regions, and having at least one portion characterized by randomness; and generating on a second object, a geometric configuration which is a geometric complement of the first random geometric configuration. An alignment stage of the novel method comprises juxtaposing the first and second objects so that the first geometric configuration and its complement generate a unique dark spot; and, rotating the first and second objects about an axis normal to the first object and centered at the dark spot, until a transmissivity of the juxtaposed objects is at a minimum.

7 Claims, 16 Drawing Sheets

OPTICAL ALIGNMENT METHOD USING ARBITRARY GEOMETRIC FIGURES

CROSS-REFERENCE TO A RELATED APPLICATION

This application is related to U.S. application Ser. No. 07/516,013 filed Apr. 26, 1990 by Dey, which Application is being filed contemporaneously with this application. The entire disclosure of this Application is incorporated by reference herein. Each of these applications is copending and commonly assigned.

FIELD OF THE INVENTION

This invention relates to an optical alignment method.

INTRODUCTION TO THE INVENTION

Optical alignment methods are well-known, and vital. The alignment methods may be employed, for example, to realize an alignment of rotating machinery in power plants, or an alignment of parts in heavy machine tools, etc.

In general, one important purpose of optical alignment methods is to position and orient an object at a distance to a reference set of coordinates. Since the object has six degrees of freedom (three in translation, and three in rotation), the purpose of the optical alignment method becomes that of constraining the object in all six of these degrees of freedom: positioning, which constrains the object in translation; and, auto-collimation, which constrains the object in rotation. Conventional alignment telescopes may be employed, for example, for realizing these constraints.

SUMMARY OF THE INVENTION

I have been working on an optical alignment method that is different from the alignment telescope, and which incorporates an analysis of Moiré fringes, as generated by way of a pair of inter-active Ronchi rulings.

To explain this last method, attention is directed to FIGS. 1-6. In particular, FIG. 1 shows a conventional straight line Ronchi ruling 10. The straight line Ronchi ruling 10 comprises a known amplitude grating comprising spaced-apart ruling bands 12. FIGS. *2a, b,* in turn, show a pair of Ronchi rulings 14 and 16, where each of the Ronchi rulings 14 and 16 comprises identical Ronchi rulings, of the type shown in FIG. 1. It is now to be imagined that the FIG. 2 Ronchi rulings 14 and 16 individually represent a pair of planar faces for two objects 18, 20, and of whose mutual alignment one desires to effect.

Now, if the two objects 18, 20 are identically or congruently juxtaposed, or aligned, then a resulting composite Ronchi ruling will be identical to that shown in FIG. 1, above. On the other hand, if the two objects 18, 20 cannot be identically or congruently juxtaposed or aligned, as in FIG. 3, where the two objects are offset by an angle $\theta$, then a resulting composite Ronchi ruling will be that of the type shown in FIG. 4, comprising Moiré fringes 22. Restated, the FIG. 4 Moiré fringes 22 are generated when the two Ronchi rulings 14, 16 are juxtaposed at the angle $\theta$: an indicia of the mis-alignment of the two objects 18, 20, therefore, is the existence of the Moiré fringes.

The Ronchi-Moiré method has an apparent advantage of simplicity, but I have discovered various problems and difficulties with it, which may offset the advantage. For example, as shown in FIG. 5, the two objects 18, 20 may be linearly displaced, $\Delta Y$, and therefore only partially aligned. The resulting composite Ronchi ruling will not induce Moiré fringes; nevertheless, the objects 18, 20 are clearly not entirely aligned, due to the linear displacement. As another off-setting example, shown in FIG. 6, there may be an apparent alignment, as suggested by a nominal or less than visually distinctive Moiré fringe pattern 24 generated by curved Ronchi rulings; nevertheless, a desired accuracy of alignment may be thwarted, due to an inherent human subjectivity in "reading" the Moiré fringe pattern 24. Finally, while the Ronchi-Moiré method may asymptotically approach the required state of congruency or alignment, this state may not be uniquely evidenced. This last insight is a key to why the Ronchi-Moiré method must remain largely subjective.

I have now discovered a novel method that is suitable for uniquely aligning first and second objects.

In a first aspect of the present invention, the novel method comprises a pre-alignment stage comprising generating on a first object a first geometric configuration comprising dark and clear regions, and having at least one portion characterized by randomness; and, generating on a second object, a geometric configuration which is a geometric complement of the first random geometric configuration. An alignment stage of the novel method comprises juxtaposing the first and second objects so that the first geometric configuration and its complement generate a unique dark spot; and, rotating the first and second objects about an axis normal to the first object and centered at the dark spot, until a transmissivity of the juxtaposed objects is at a minimum.

An important advantage of the novel method, as defined, is that one may uniquely evidence a required state of congruency or alignment of the two objects. A reason for this advantage may be understood by way of a theoretical analogy with a mathematical topological property conventionally called the "crumpled paper theorem". As illustrated in FIG. 7, the crumpled paper theorem holds that a domain point 26 on a non-crumpled piece of paper 28, may be mapped to a unique, complementary range point 26' on the crumpled paper 28. (and, vice versa). Turning to my method, now, the crumpled paper theorem suggests that the alignment stage corresponds to driving the paper from a crumpled to a non-crumpled state; and, that alignment of the two objects may be re-acquired by generating and expanding the dark spot, the dark spot corresponding to the unique topological equivalency of the domain point/range point. Other important advantages of this first aspect of the novel method are discussed below.

A second aspect of the present invention comprises a method which is suitable for uniquely aligning first and second objects, the method comprising a pre-alignment stage comprising the steps of (1) generating on a first object a first geometric configuration comprising dark and clear regions and having at least one portion characterized by randomness; and (2) generating on a second object, a geometric configuration which is a positive geometric replica of the first random geometric configuration; and an alignment stage, comprising the steps of (3) juxtaposing the first and second objects so that the first geometric configuration and its replica generate a unique grey spot; and, (4) rotating the first and second objects about an axis normal to the first object and centered at the grey spot, until a transmissivity of the juxtaposed objects is at a maximum.

BRIEF DESCRIPTION OF THE DRAWING

The invention is illustrated in the accompanying drawing, in which.

DETAILED DESCRIPTION OF THE INVENTION

The detailed description of the invention follows the format of the invention as summarized above.

The Pre-Alignment Stage

The pre-alignment stage of the present invention in its first aspect comprises the steps of generating on a first object a first geometric configuration comprising dark and clear regions, and having at least one portion characterized by randomness; and, generating on a second object, a geometric configuration which is a geometric complement of the first random geometric configuration.

The first and second objects may comprise substantially planar sheets of mylar, or clear plastic sheets. Alternatively, the first and second objects may comprise substantially transparent sheets of paper, or thin photographic glass plate. Preferably, the first and second objects comprise a film base, for example, a film base available in an Eastman Kodak Estar AH product. The film base is preferred because it can facilitate the step of generating the geometric configurations.

The step of generating the geometric configurations preferably comprises the following two sub-steps.

Figure 1:
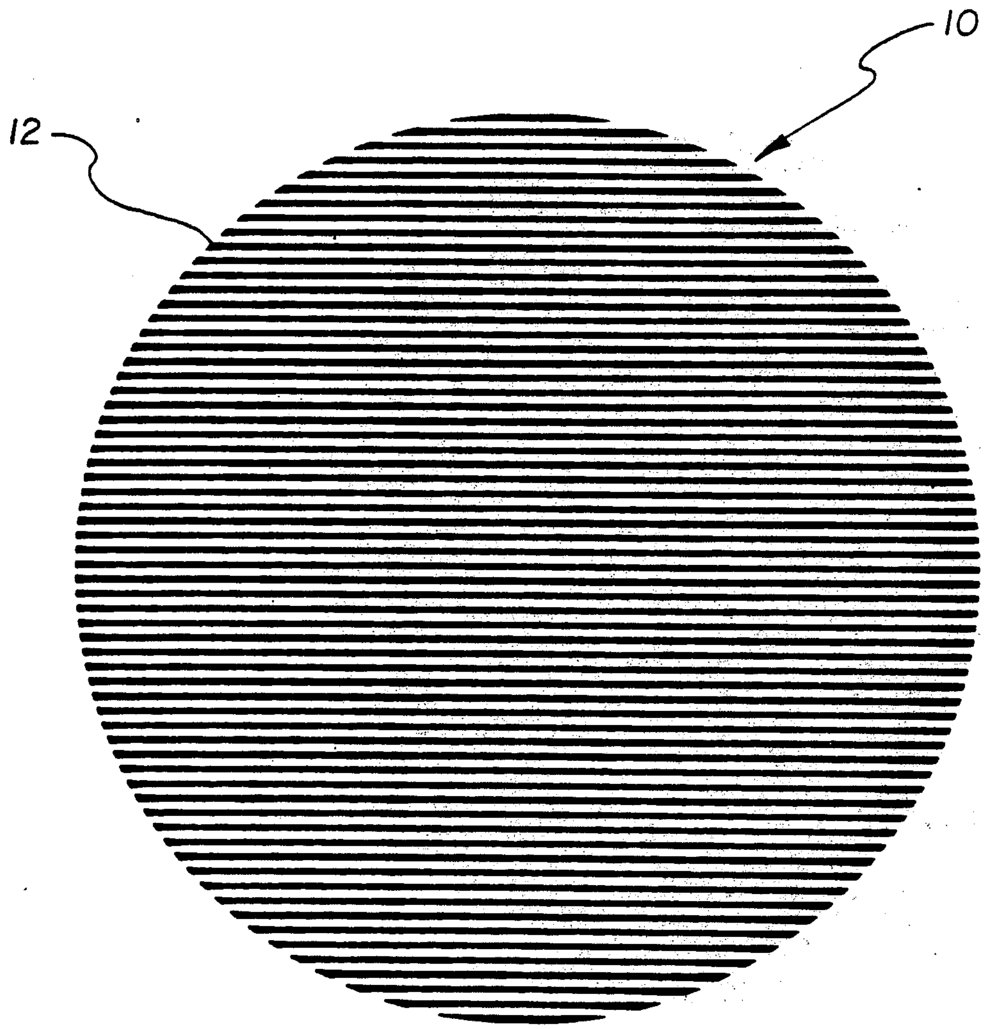
FIG. 1 shows a conventional straight line Ronchi ruling.
Figure 2A:
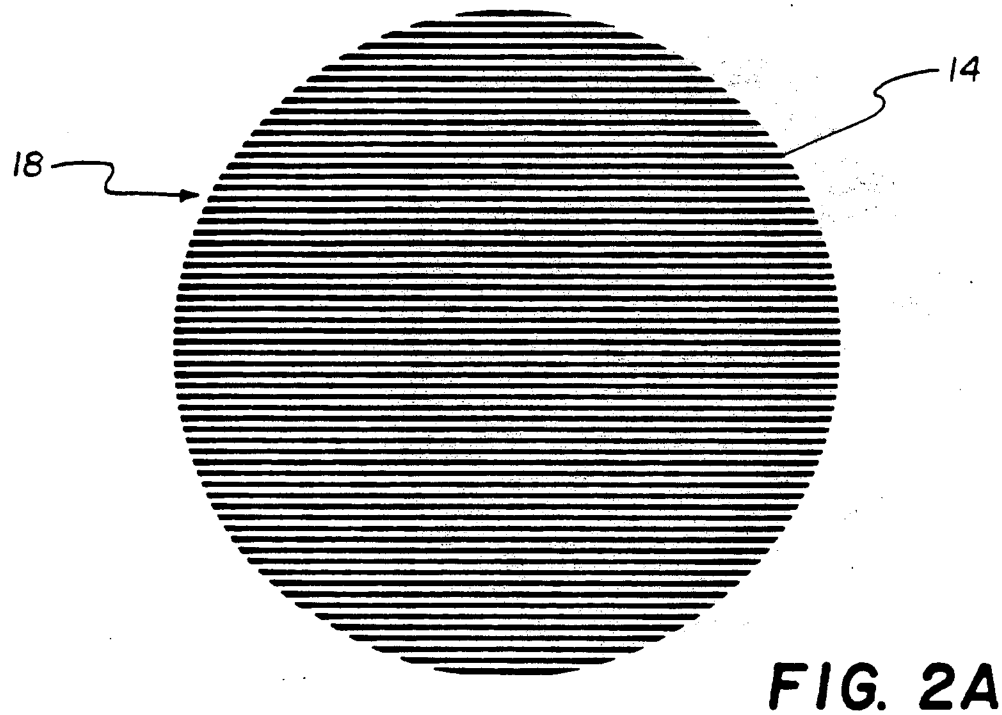
FIGS. 2A,B, show a pair of conventional Ronchi rulings.
Figure 2B:
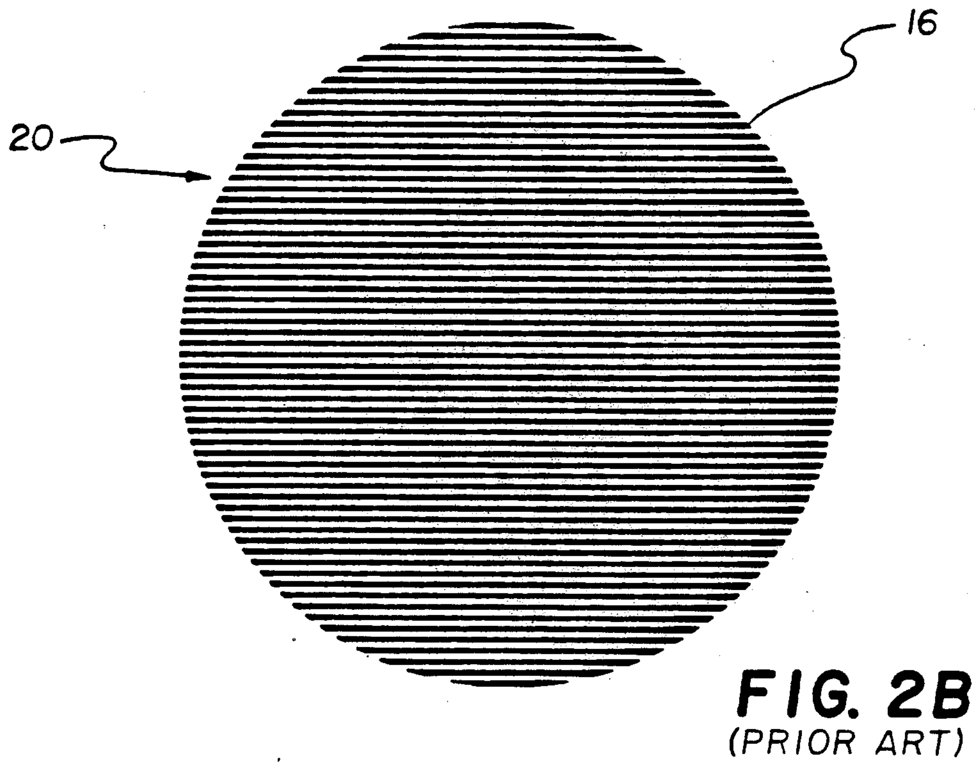
Figure 3:
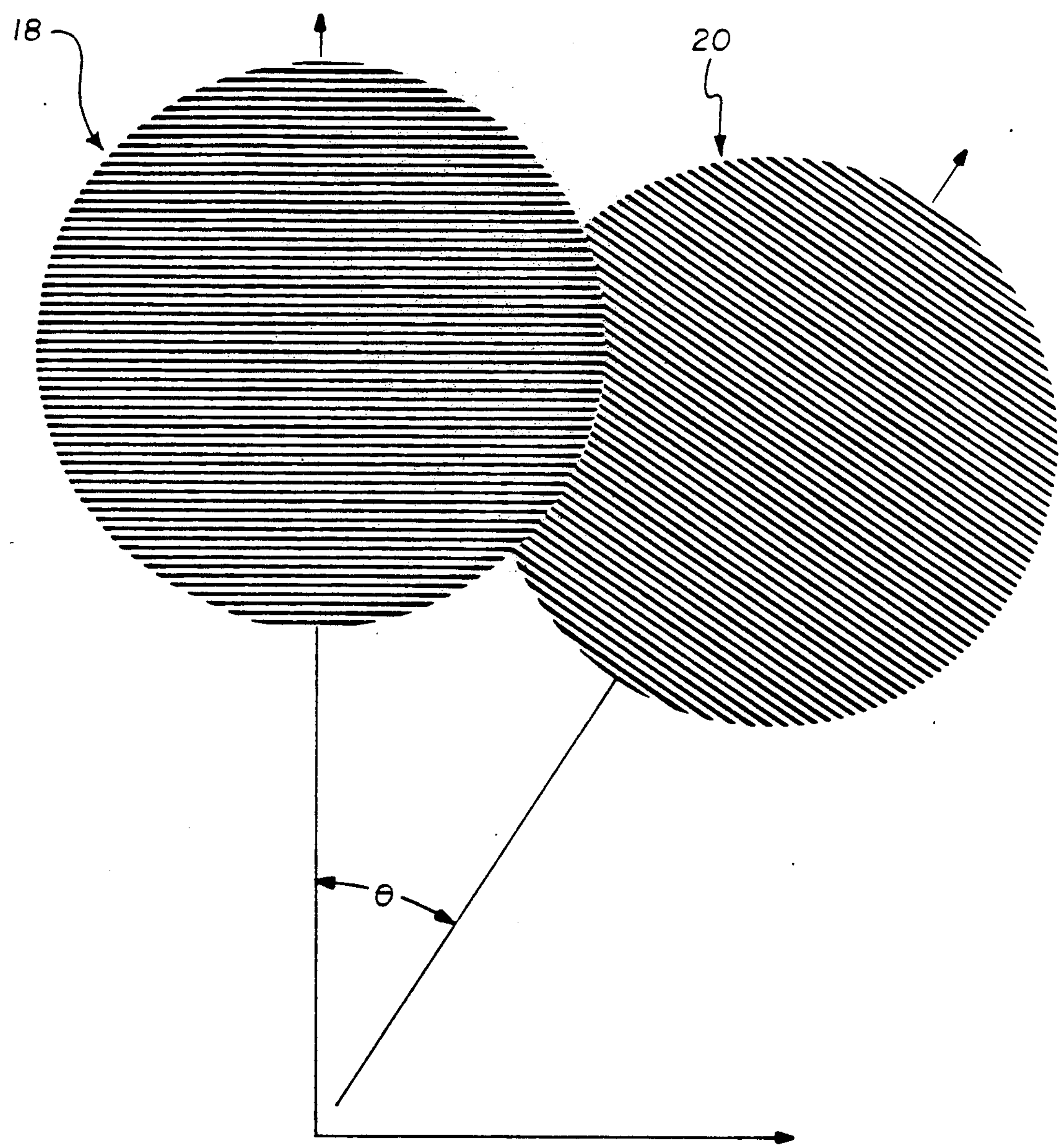
FIG. 3 shows a pair of juxtaposed Ronchi rulings, offset by an angle.
Figure 4:
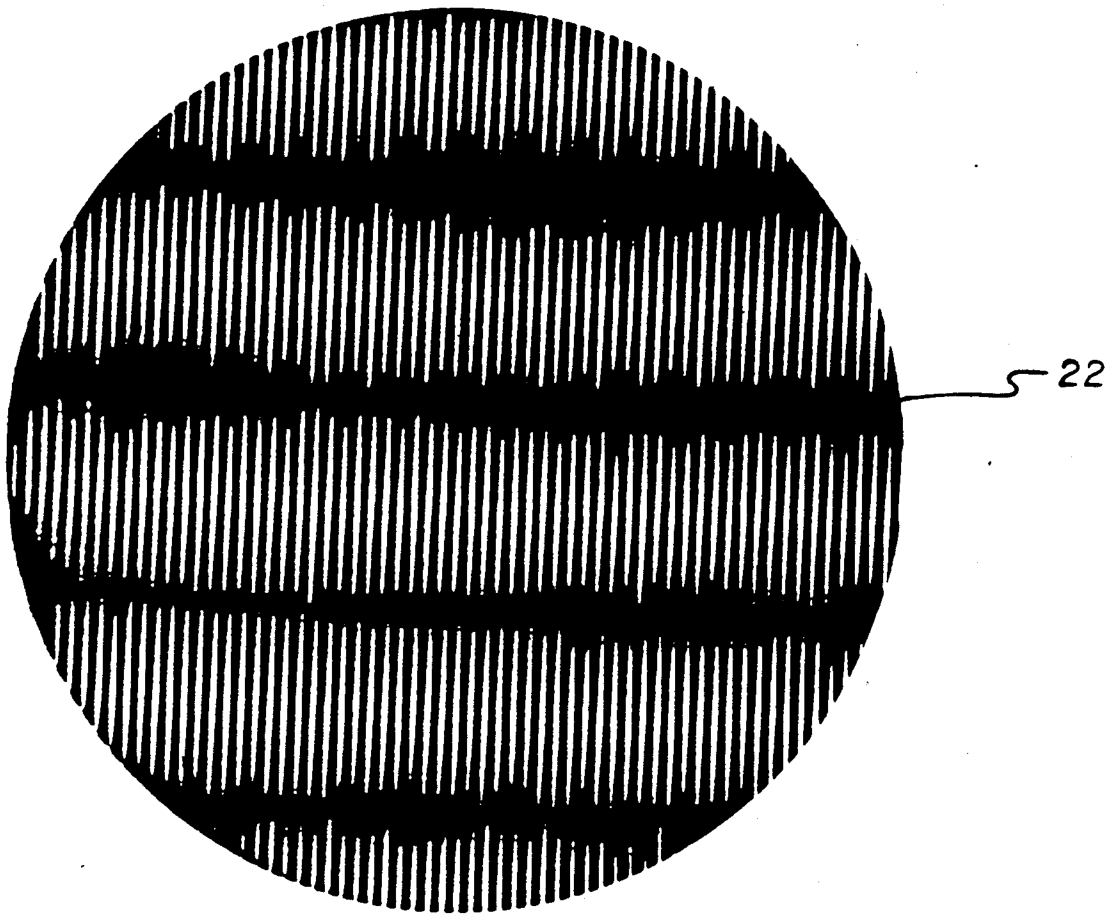
FIG. 4 shows a Moiré fringe pattern generated by the FIG. 3 Ronchi rulings.
Figure 5:
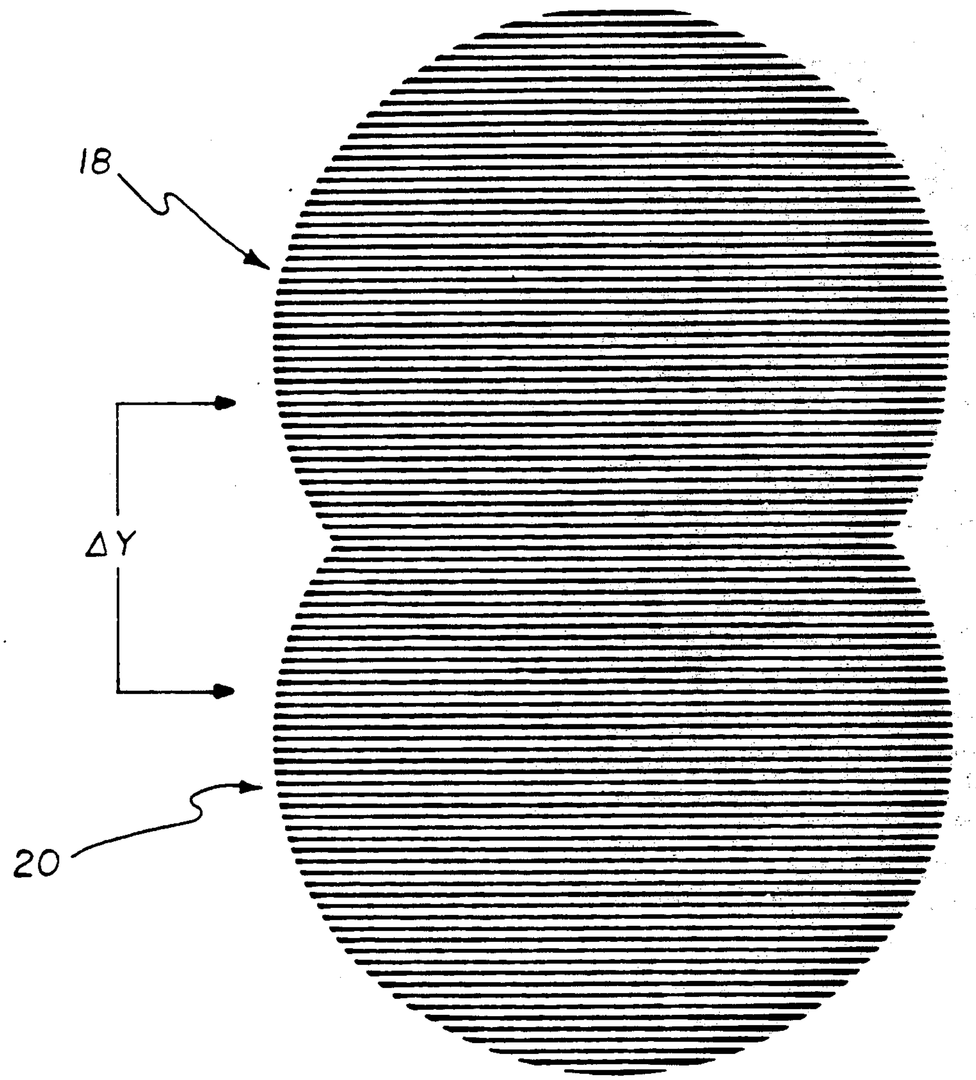
FIG. 5 shows a pair of planar faces for two objects, linearly displaced.
Figure 6:
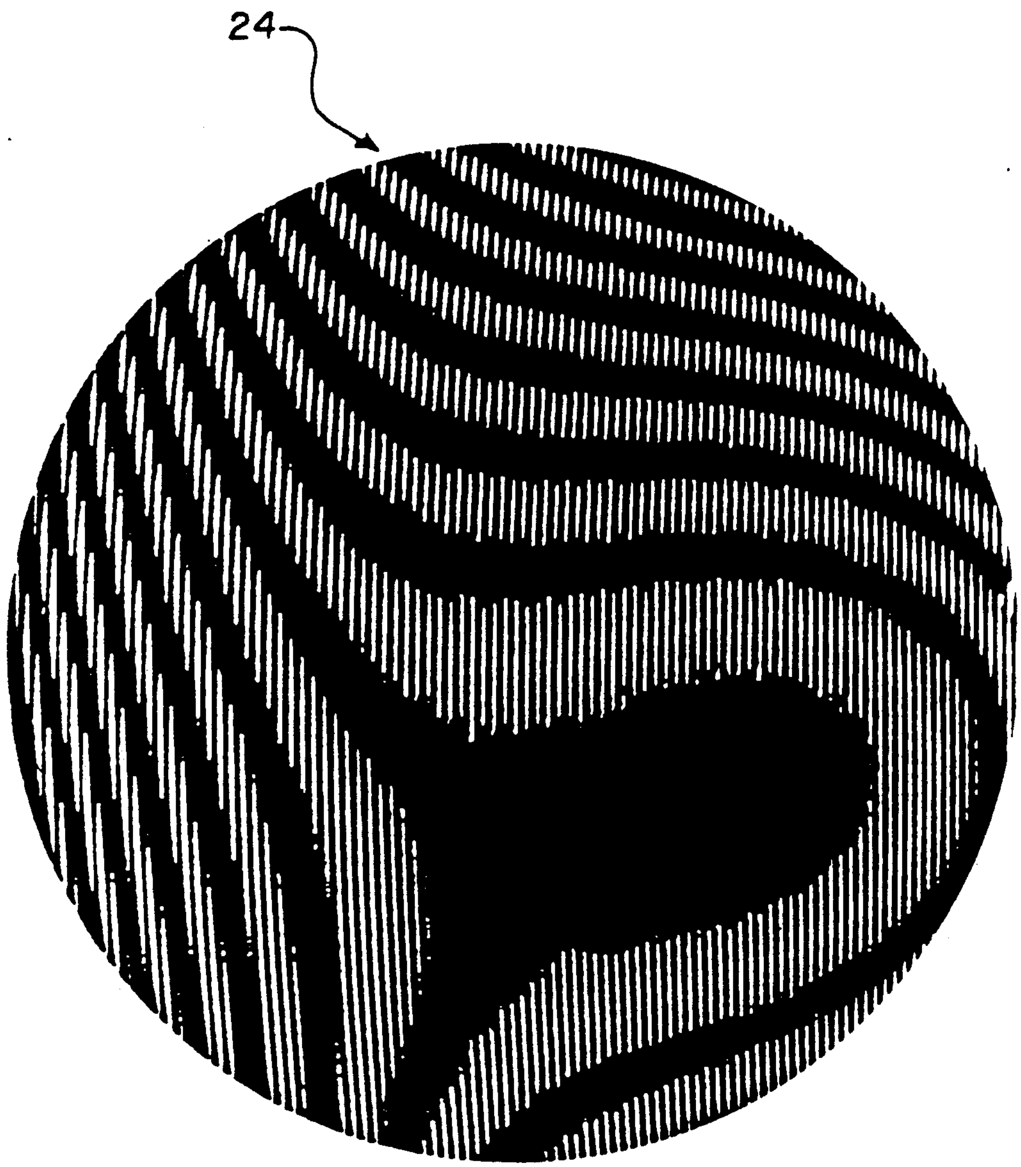
FIG. 6 shows a visually non-distinctive pattern.
Figure 7:
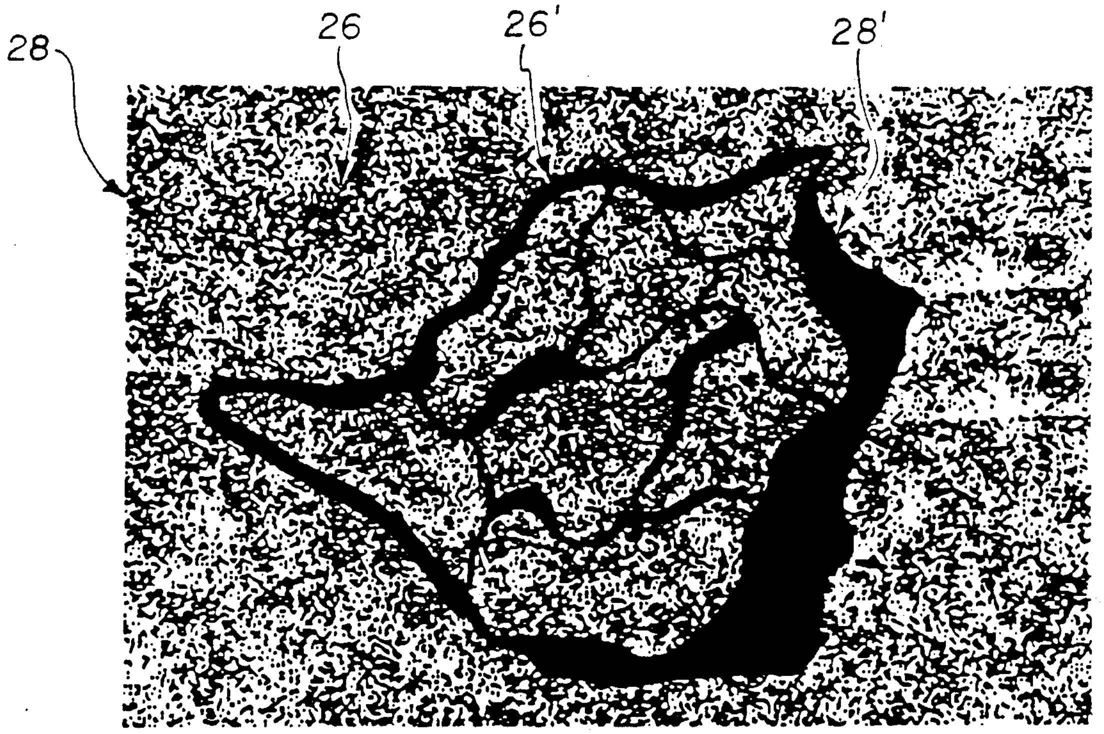
FIG. 7 illustrates a mathematical topological property of a "crumpled paper theorem"
Figure 8:
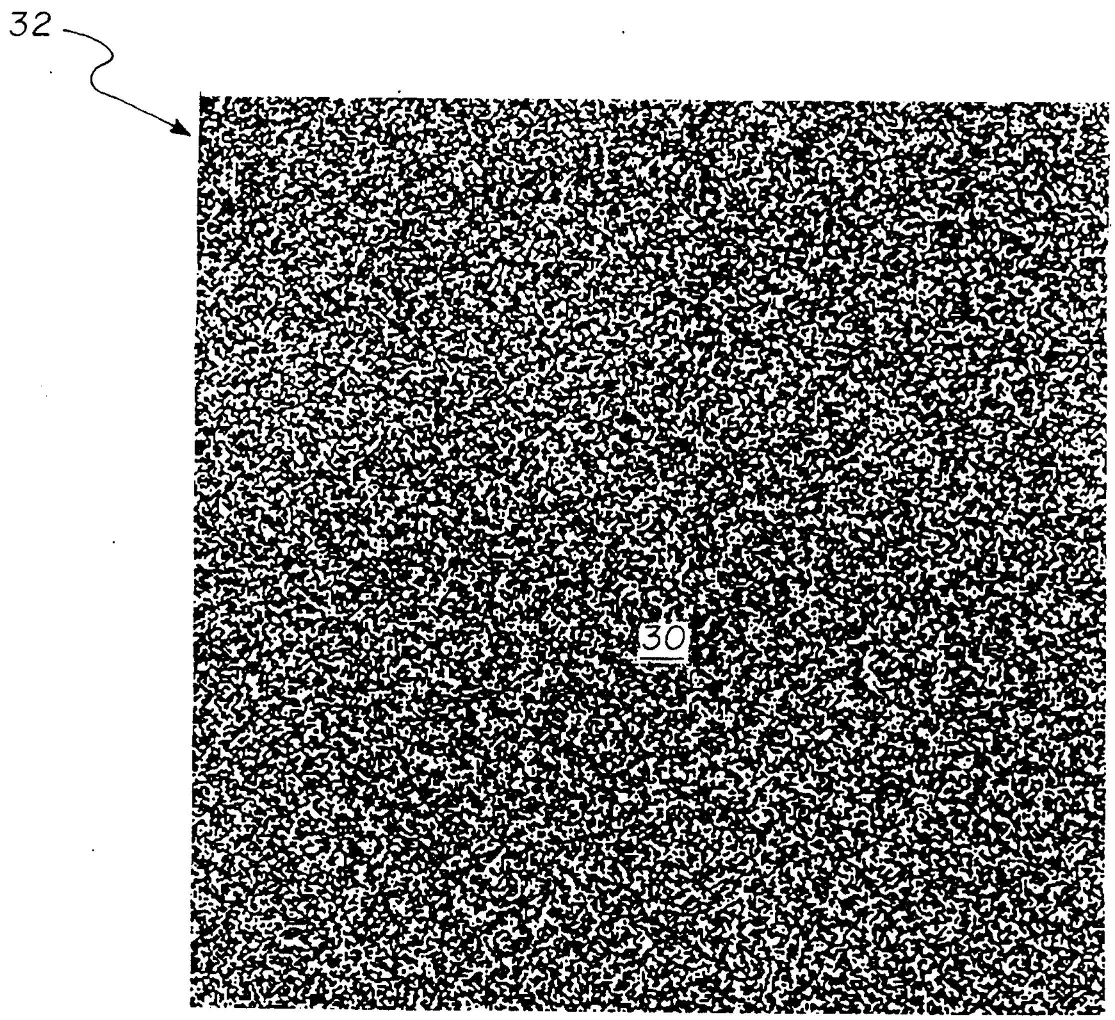
FIG. 8 shows a random dot pattern generated as an example in accordance with a pre-alignment stage of the present invention.

The first sub-step preferably comprises generating a random and monolithic dark and clear dot pattern 30 on a first object 32, as shown in FIG. 8. The FIG. 8 example of such a random dark/clear dot pattern 30 has been generated by a computer using conventional techniques. The random dark dots (black) have a size which is preferably less than 1.0 millimeter, especially preferably less than 100.0 microns, most especially less than 10.0 microns. By dark or black dots, I mean those having a transmissivity of approximately 0.0, in contrast to the clear areas, which have a transmissivity of approximately 1.0.

Figure 9:
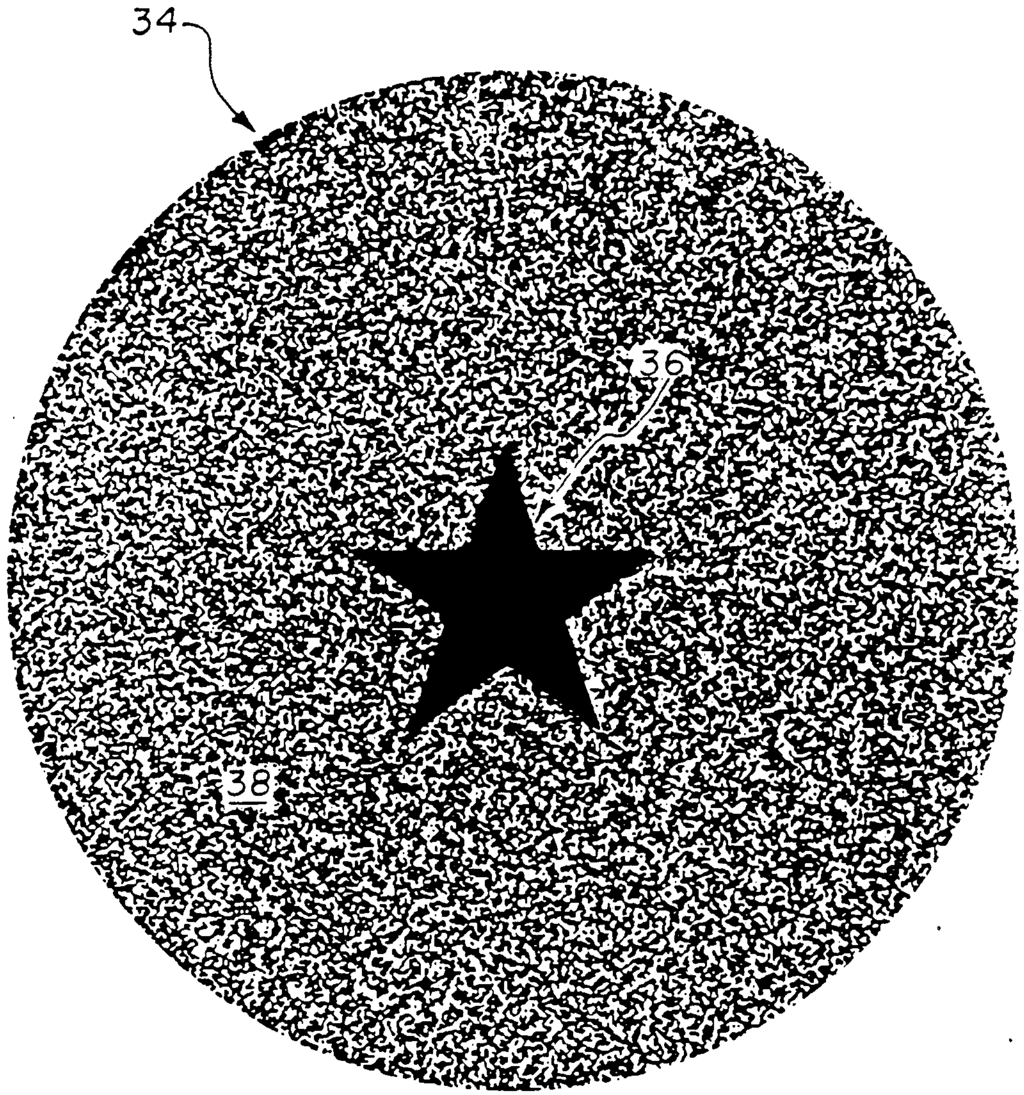
FIG. 9 shows a geometric configuration generated as a second example, in accordance with a pre-alignment stage of the present invention.

Alternatively, instead of the FIG. 8 monolithic random pattern, the geometric configuration may comprise a mixed geometric configuration comprising both random and non-random portions. An example of this is shown in FIG. 9. FIG. 9 shows a geometric configuration 34 comprising a first non-random portion 36, having a uniform transmissivity of approximately 0.0, and a second random portion 38 generated in the manner specified above in FIG. 8. One utility of the FIG. 9 geometric configuration 34 is that the non-random portion 36 can function as a coarse alignment fiducial.

Figure 10:
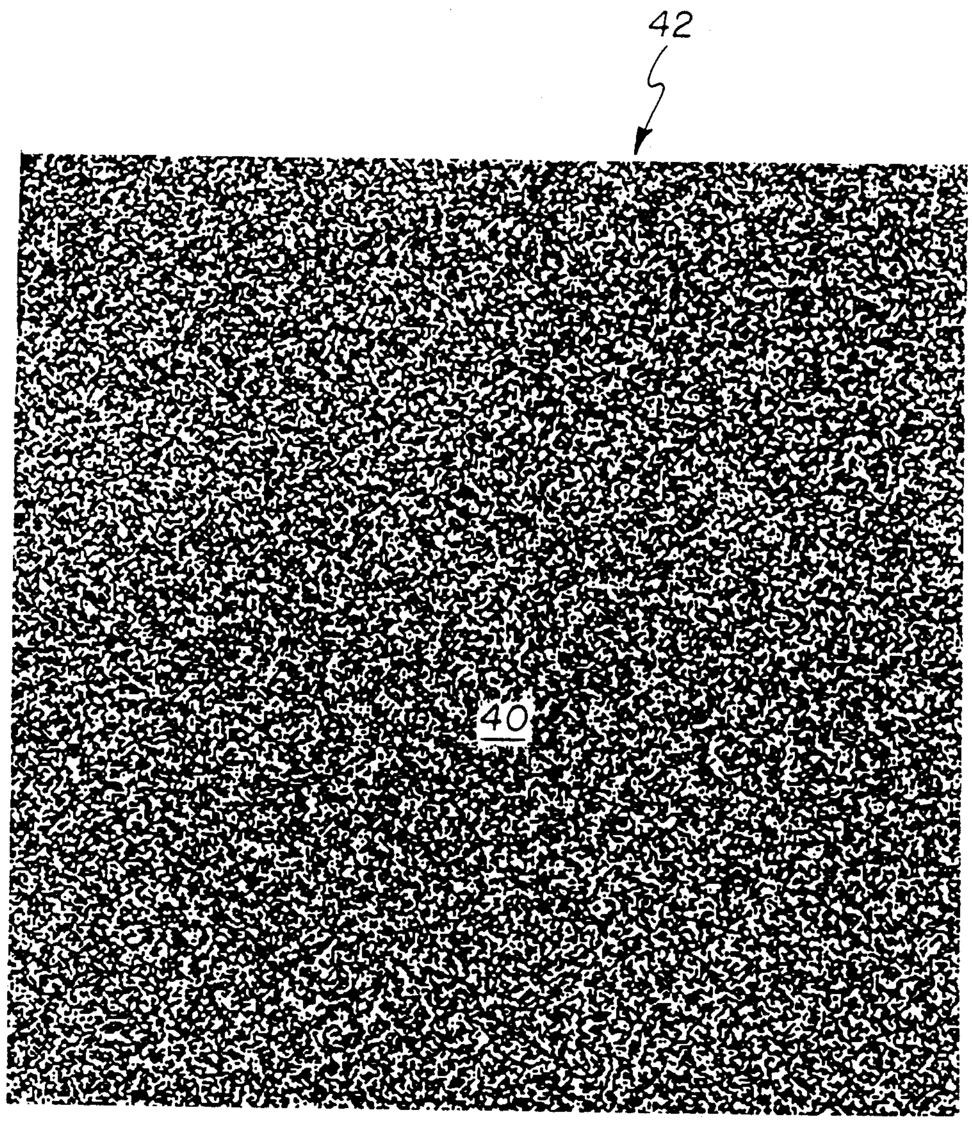
FIG. 10 shows a geometric configuration which comprises a geometric complement of the FIG. 8 random dot pattern.
Figure 11:
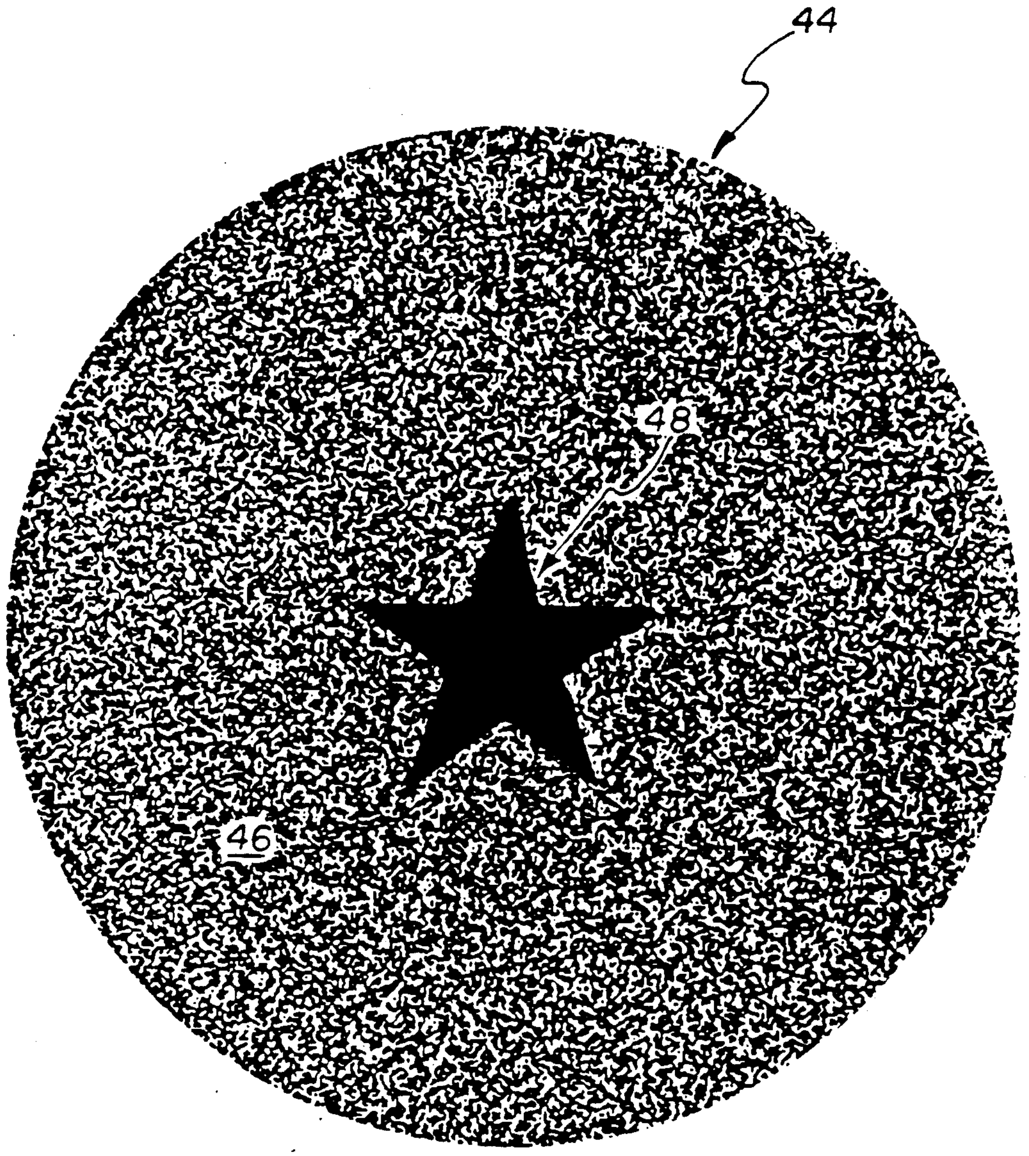
FIG. 11 shows a geometric configuration which comprises a geometric complement of the FIG. 9 geometry.

The second sub-set of the process of generating the geometric configuration comprises the step of generating on the second object, a geometric configuration which is the geometric complement of the first random geometric configuration. Accordingly, for the exemplary random dot pattern 30 of FIG. 8, a geometric configuration 40 comprising its complement, on a second object 42, is shown in FIG. 10. The FIG. 10 complementary configuration 40 is preferably generated by lithographically contacting a photonegative of the FIG. 8 random dot pattern 30, using conventional techniques—the photonegative thus representing the desired complementary configuration 40, i.e., black dots become clear areas; clear areas become black dots. For the exemplary FIG. 9 geometric configuration, in turn, its random geometric complement 44, shown in FIG. 11, may be generated in the same manner as that just specified, i.e., lithographically, so that a random portion 46 is the complement of FIG. 9's random portion 38. Note, however, that the FIG. 9 fiducial portion 36 can remain the same in FIG. 11, as a dark portion 48.

Although the second sub-step process of generating the geometric complement is preferably generated by lithographic techniques, it may alternatively be realized by well-known computer software techniques.

The Alignment Stage

The alignment stage of the present invention in its first aspect comprises juxtaposing the first and second objects so that the first geometric configuration and its complement generate a unique dark spot; and, rotating the first and second objects about an axis normal to the first object and centered at the dark spot, until a transmissivity of the juxtaposed objects is at a minimum. The detailed description of the alignment stage will proceed by developing the dot pattern 30 example illustrated in FIGS. 8, 10 supra.

Figure 12:
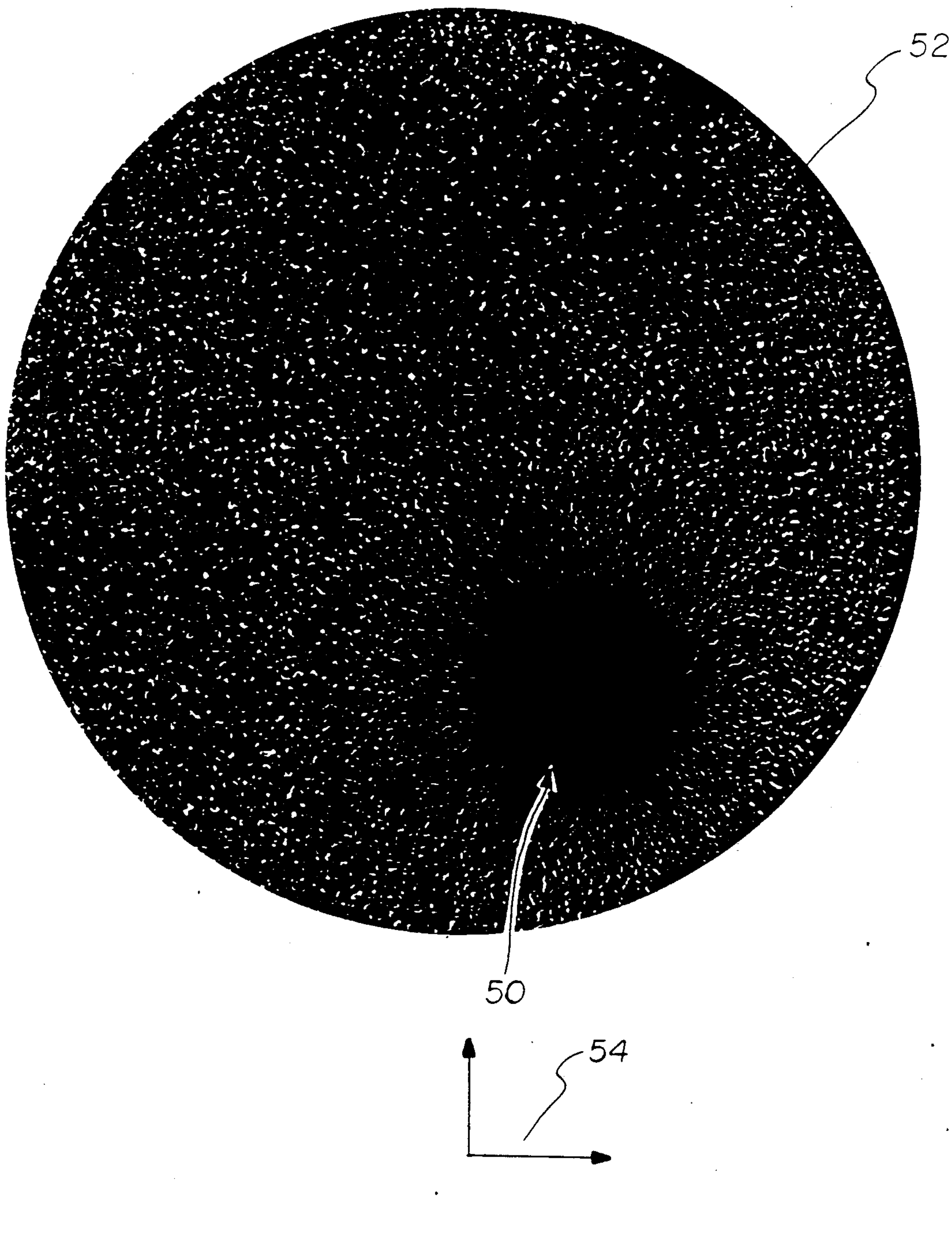
FIG. 12 shows a composite geometric pattern generated by juxtaposing the FIGS. 8 and 10 geometric configurations.
Figure 13:
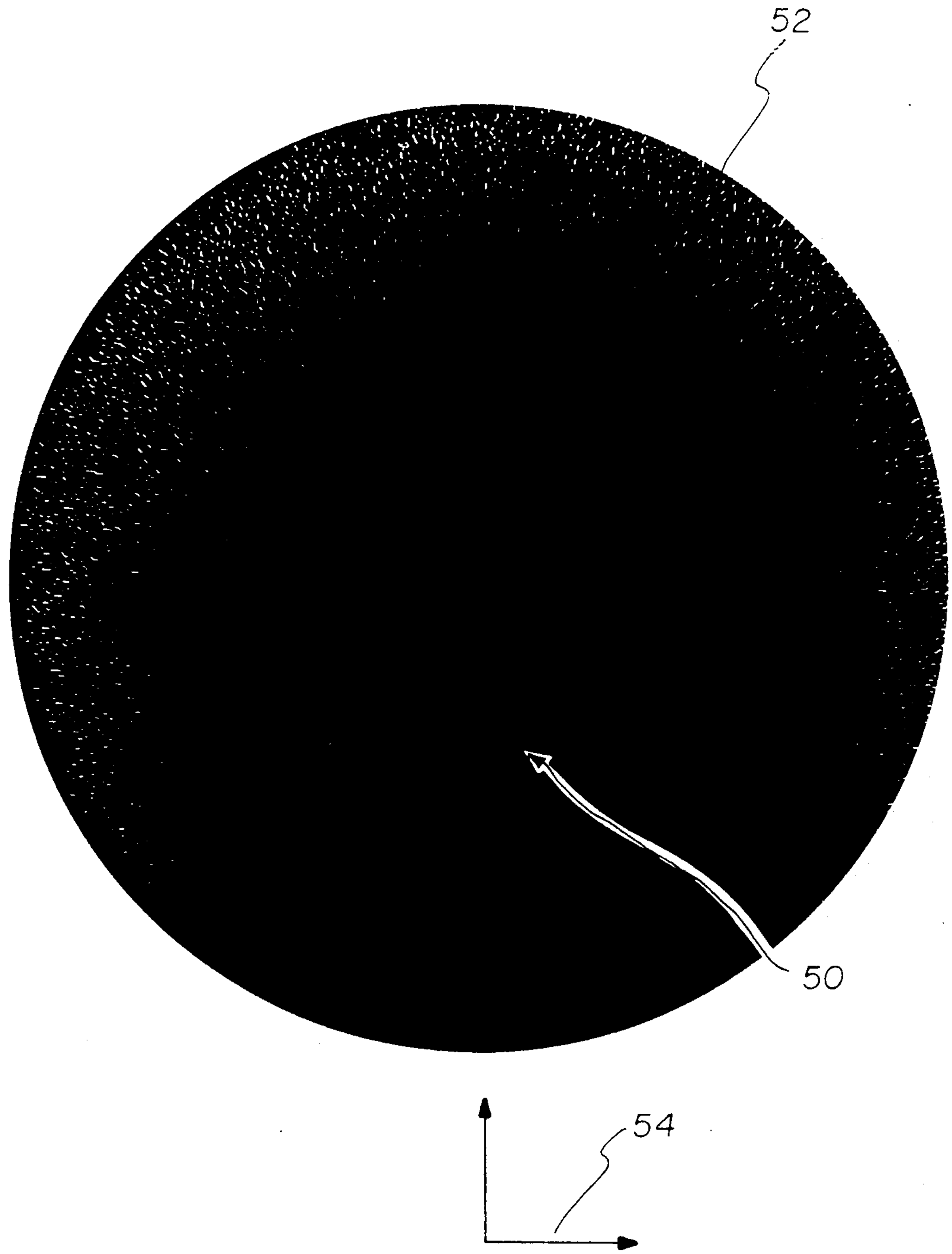
FIG. 13 shows a composite geometric pattern generated in accordance with an alignment stage of the present invention.
Figure 14:
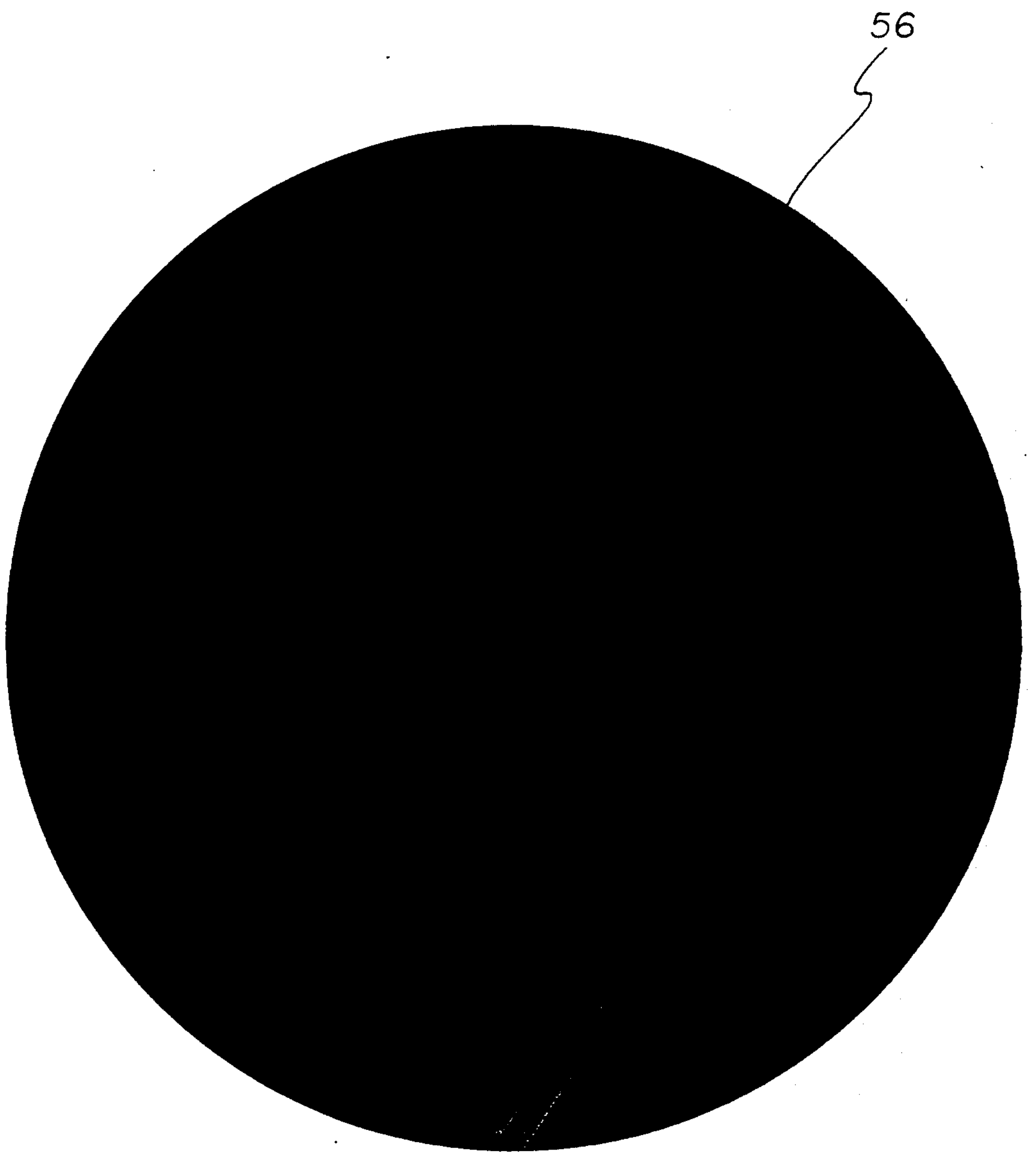
FIG. 14 shows a composite geometric pattern generated in accordance with the method of the present invention, and indicating a unique alignment of two objects.

Accordingly, the alignment stage for this example first comprises juxtaposing the FIG. 8 random dot pattern 30 on the first object 32, with its geometric complement 40 on the second object 42, shown in FIG. 10. This action, requiring translational movement in an X and Y direction, of either or both of the objects 32, 42, and preferably comprising their physical contact, in turn, generates a dark spot 50 in a composite geometric pattern 52 (FIG. 12). Now, in correspondence to the crumpled paper theorem summarized above, one re-aligns the objects, or "un-crumples the paper", by rotating the objects 32, 42, relative to each other about axes 54, normal to the first object 32, and centered at the dark spot 50, until a transmissivity of the composite geometric configurations is at a minimum, for example, 0.0. This continual process is shown in FIG. 13, which shows an ever larger dark spot 50. A final rotation action generates a substantially completely dark field 56, as shown in FIG. 14, thus earmarking the unique state of alignment of the two objects 32, 42.

In accordance with the present method, one can remotely distinguish and align two six-inch diameter glass plates to 0.2 microns in translation, and 0.3 arc-seconds in rotation, at a distance of 1.0 kilometer, the pattern being viewed with a four-inch aperture telescope, through a turbulent atmosphere, using a magnification of 200×.

Figure 15:
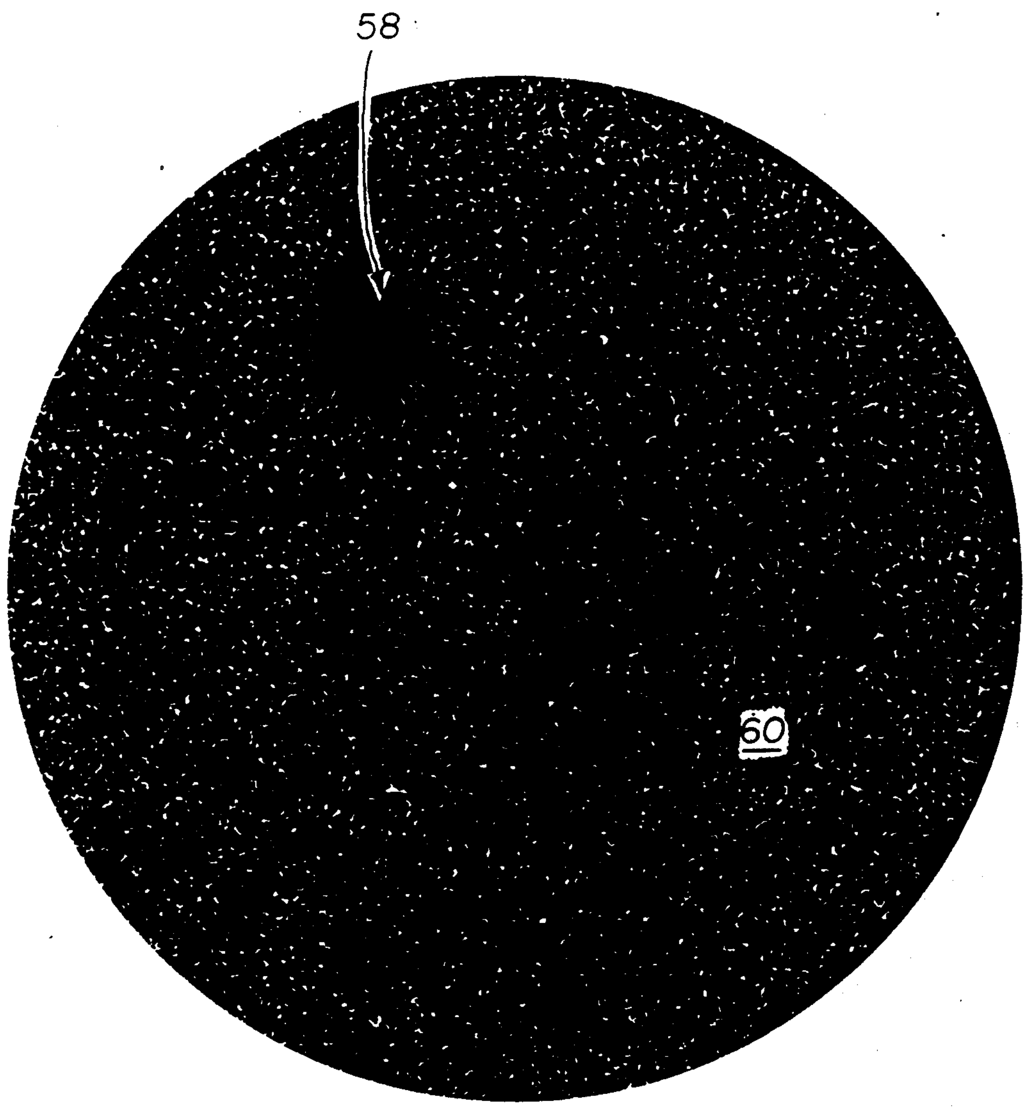
FIG. 15 shows a composite geometric pattern generated in accordance with an alignment stage of a second aspect of the present invention.
Figure 16:
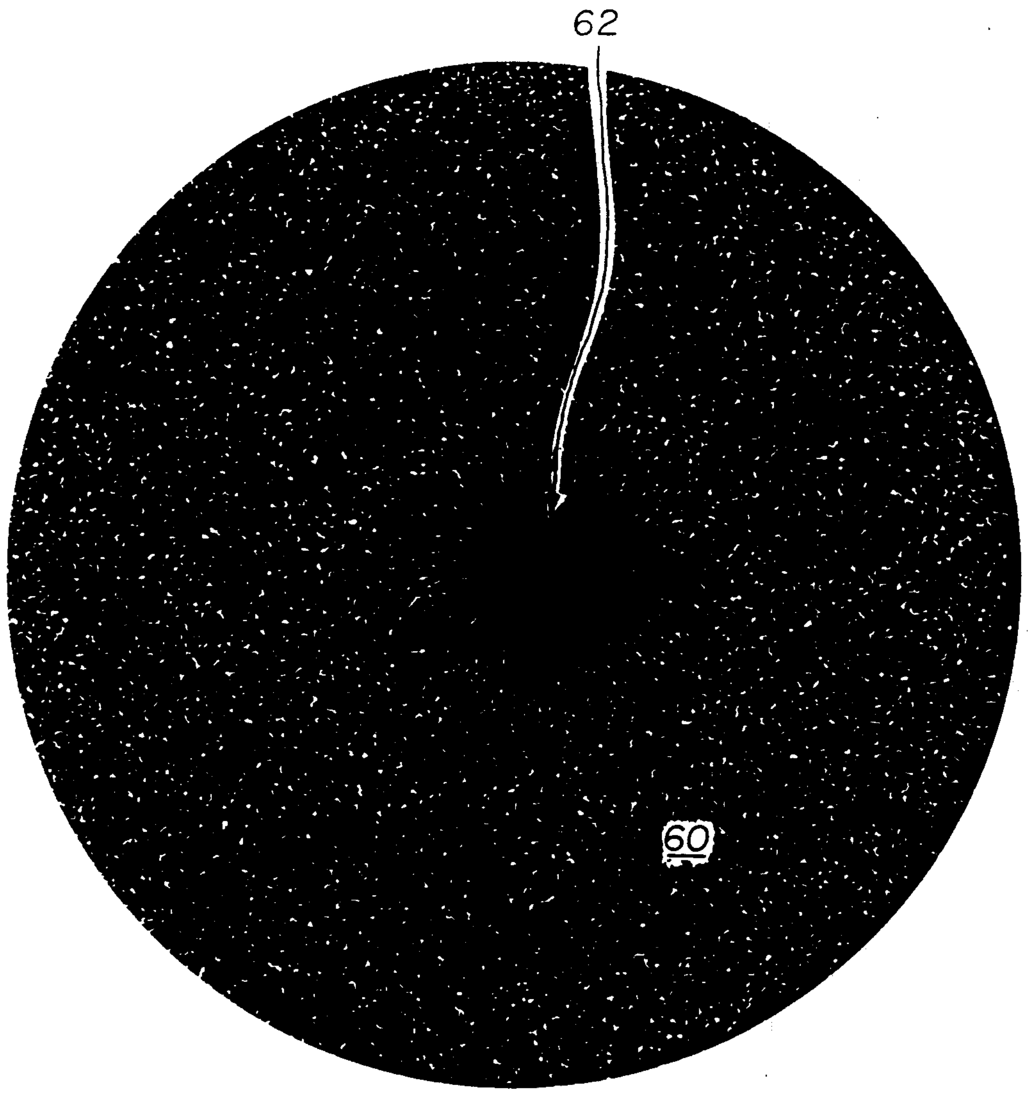
FIG. 16 shows a composite geometric pattern generated in accordance with a further alignment (compared to FIG. 15) stage of a second aspect of the present invention.

For the second aspect of the present invention summarized above, one may employ the FIG. 8 random dot pattern twice: i.e., as a first geometric configuration, and again as its positive geometric replica. The alignment stage for this aspect of the invention proceeds in a manner substantially identical to that discussed above for the first aspect, with one difference being that a unique gray spot is developed (FIG. 15, numeral 58), against a continued backdrop of randomness (numeral 60); and expanded (FIG. 16, numeral 62) until the juxtaposed objects realize a transmissivity that is a maximum.

What is claimed:

1. A method which is suitable for uniquely aligning first and second objects, the method comprising a pre-alignment stage comprising the steps of (1) generating on a first object a first geometric configuration comprising dark and clear regions and having at least one portion characterized by a first random geometric configuration; and (2) generating, on a second object, a geometric configuration which is a geometric complement of the first random geometric configuration;

and an alignment stage, comprising the steps of (3) juxtaposing the first and second objects so that the first geometric configuration and its complement generate a unique dark spot; and, (4) rotating the first and second objects about an axis normal to the first object and centered at the dark spot, until a transmissivity of the juxtaposed objects is at a minimum.

2. A method according to claim 1, wherein step 1 comprises the step of computer generating a random and monolithic first geometric configuration.

3. A method according to claim 1, wherein step 2 comprises lithographically generating the geometric complement.

4. A method according to claim 1, wherein step 3 comprises translating the first and second objects relative to each other.

5. A method of physically contacting the first and second objects.

6. A method according to claim 1, wherein step 4 comprises rotating the first and second objects until a transmissivity of the composite geometric configuration is approximately 0.0.

7. A method which is suitable for uniquely aligning first and second objects, the method comprising a pre-alignment stage comprising the steps of (1) generating on a first object a first geometric configuration comprising dark and clear regions and having at least one portion characterized by a first random geometric configuration; and (2) generating on a second object, a geometric configuration which is a positive geometric replica of the first random geometric configuration;

and an alignment stage, comprising the steps of (3) juxtaposing the first and second objects so that the first geometric configuration and its replica generate a unique grey spot; and, (4) rotating the first and second objects about an axis normal to the first object and centered at the grey spot, until a transmissivity of the juxtaposed objects is at a maximum.

* * * * *

UNITED STATES PATENT AND TRADEMARK OFFICE

CERTIFICATE OF CORRECTION

PATENT NO. : 5,054,929

DATED : October 8, 1991

INVENTOR(S) : Thomas W. Dey

It is certified that error appears in the above-identified patent and that said Letters Patent is hereby corrected as shown below:

| | |
|---|---|
| Col. 3, line 22 | after "non-distinctive" insert --Moiré--; |
| Col. 6, line 22 | after "method" insert --according to claim 4, comprising the step--. |

Signed and Sealed this

Twenty-third Day of February, 1993

Attest:

STEPHEN G. KUNIN

Attesting Officer

Acting Commissioner of Patents and Trademarks